(12) United States Patent
Felip Leon et al.

(10) Patent No.: US 12,502,771 B2
(45) Date of Patent: Dec. 23, 2025

(54) ENERGY EFFICIENT ROBOTIC ARM

(71) Applicant: Intel Corporation, Santa Clara, CA (US)

(72) Inventors: Javier Felip Leon, Hillsboro, OR (US); Julio Zamora Esquivel, Zapopan (MX); Leobardo Campos Macias, Guadalajara (MX); Javier Turek, Beaverton, OR (US); David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 18/537,250

(22) Filed: Dec. 12, 2023

(65) Prior Publication Data

US 2025/0187181 A1    Jun. 12, 2025

(51) Int. Cl.
*B25J 9/16* (2006.01)

(52) U.S. Cl.
CPC ............. *B25J 9/163* (2013.01); *B25J 9/1666* (2013.01)

(58) Field of Classification Search
CPC ......... B25J 9/163; B25J 9/1666; B25J 9/1664
See application file for complete search history.

(56) References Cited

U.S. PATENT DOCUMENTS

| | | | | |
|---|---|---|---|---|
| 8,401,698 B2* | 3/2013 | Kamrani | ................ | B25J 9/1661 700/214 |
| 9,815,201 B2* | 11/2017 | Embon | ................ | B25J 9/1666 |
| 10,967,515 B2* | 4/2021 | Lee | ................ | B25J 9/1682 |
| 2011/0153080 A1* | 6/2011 | Shapiro | ................ | B25J 9/1666 700/255 |
| 2013/0030569 A1* | 1/2013 | Fudaba | ................ | G05B 19/423 700/245 |
| 2014/0005804 A1* | 1/2014 | Brand | ................ | G05B 19/31 700/63 |

FOREIGN PATENT DOCUMENTS

CN            120134357            6/2025

OTHER PUBLICATIONS

DeLuca, A, "A modified Newton-Euler method for dynamic computations in robot fault detection and control.", In 2009 IEEE International Conference on Robotics and Automation, (May 2009).
Karaman, S, "Incremental sampling-based algorithms for optimal motion planning", Robotics Science and Systems VI, 104(2), 267-274., (2010), 20 pgs.

* cited by examiner

*Primary Examiner* — Dalena Tran
(74) *Attorney, Agent, or Firm* — Schwegman Lundberg & Woessner, P.A.

(57) ABSTRACT

Various aspects of techniques, systems, and use cases may be used for operating, controlling, programming, or configuring an energy efficient robotic arm. An example technique may include identifying a planned trajectory for a robotic arm, selecting a candidate joint of the robotic arm to lock, and recomputing the planned trajectory to determine a joint-locked trajectory while the candidate joint is locked. The example technique may include outputting a control signal to lock the candidate joint and causing the robotic arm to use the joint-locked trajectory.

20 Claims, 9 Drawing Sheets

∕— 500

```
INPUT: q_s, q_g, DoFs_max, q_H(t) ∈ Q_H
OUTPUT: q(t)
1  Tree ← INSERT(q_s)
2  WHILE TRUE:
3    N_r ← RANDOM(Tree)
4    q_r ← CONFIG_SAMPLE(Constraints, DoFs_max, p_t)
5    IF COLLISION-FREE(q_r, N_r):
6      q_r(t) ← DYNAMICS(q_r, N_r)
7      IF HUMAN-TRAJECTORIES-FREE(q_r(t), q_H(t)):
8        cost ← COST(q_r(t))
9        tree ← INSERT(q_r(t), cost)
10       N_nearest ← NEAREST(q_r(t), Tree, γ*)
11       FOREACH N_near IN N_nearest:
12         IF COLLISION-FREE(q_r, N_near) AND HUMAN-TRAJECTORIES-FREE(q_r(t), q_H(t)):
13           IF IMPROVED_COST(q_r, N_near):
14             tree ← REWIRE(q_r, N_near)
15           ENDIF
16         ENDIF
17       ENDFOREACH
18       IF END_CONDITION(q_r, q_g):
19         q(t) ← CREATE_SOLUTION()
20         BREAK
21       ENDIF
22     ENDIF
23   ENDIF
24 ENDWHILE
```

FIG. 5

ENERGY EFFICIENT ROBOTIC ARM

BACKGROUND

Robots and other autonomous agents may be programmed to complete complex real-world tasks. The field of robotics has developed to use artificial intelligence (AI) technologies to perform tasks in industrial environments, among many other environments. For instance, robotics span a wide range of industrial applications, such as smart manufacturing assembly lines, multi-robot automotive component assembly, computer and consumer electronics fabrication, smart retail and warehouse logistics, robotic datacenters, etc. Often robots interact with humans to complete tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates pseudocode for a variable degree of freedom planning algorithm according to an example.

DETAILED DESCRIPTION

Figure 1:
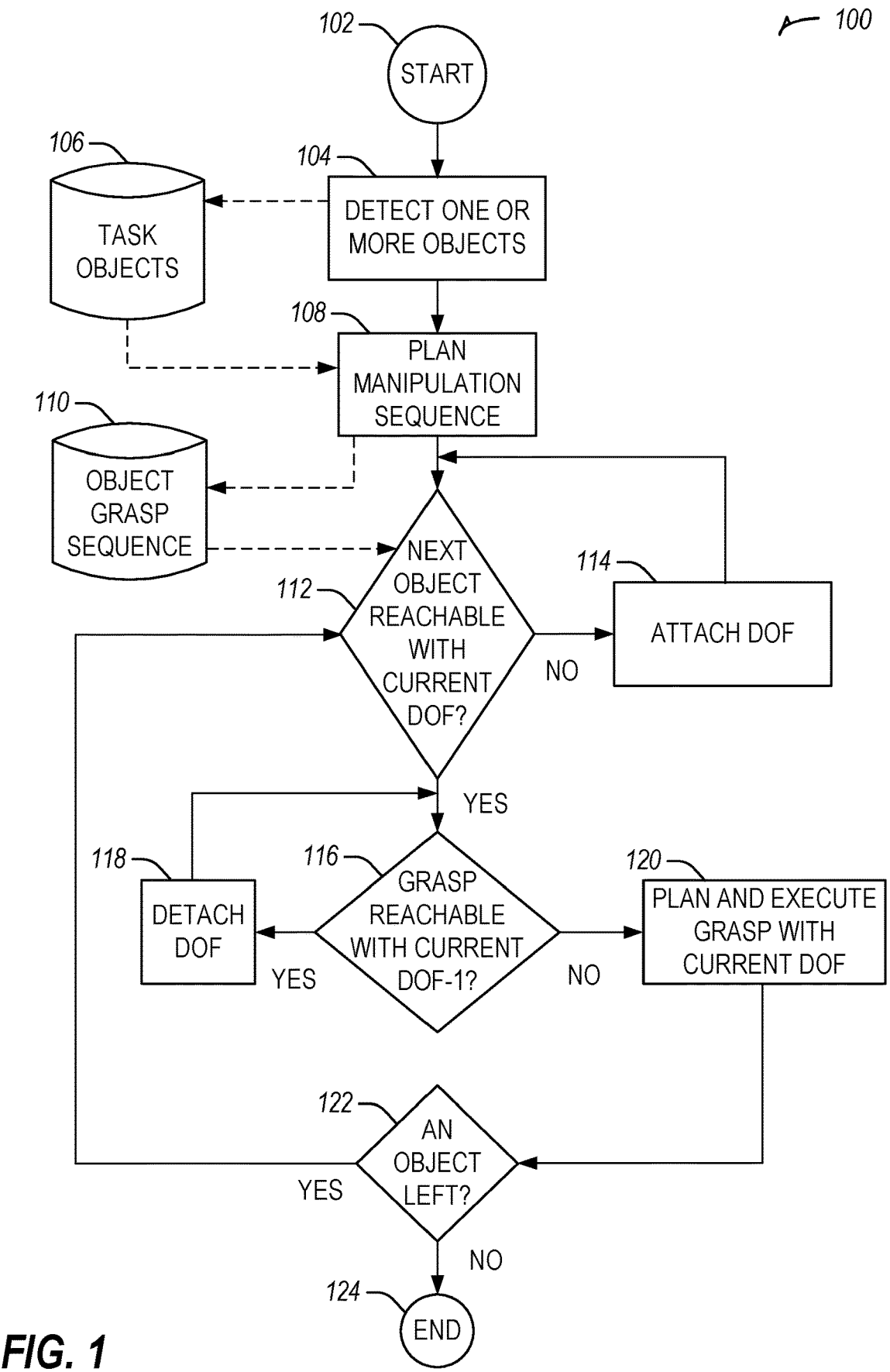
FIG. 1 illustrates a block diagram showing robotic task degree of freedom planning according to an example.

Systems and techniques described herein provide an improved energy efficient robotic arm. A robotic arm may require use of a motor to maintain a position even when a link of the robotic arm is not moved. A robotic arm may include more than one motor, in some examples. Limiting the use of a motor, such as by locking a joint, may result in a more energy-efficient use of a robotic arm.

A robotic arm with six or more degrees of freedom (DoF) is configurable to reach any position and orientation in its workspace. This type of robotic arm is useful for general manipulation use-cases, such as unstructured object bin picking or order fulfillment centers. However, this type of robotic arm may use excessive energy because many actions of the robotic arm may be solved with fewer degrees of freedom. By using more degrees of freedom than needed, one or more motors may be energized unnecessarily. The systems and techniques described herein combine perception, planning, and control to consider energy consumption that additional degrees of freedom entail. In some examples, a modular robotic arm to dynamically adapt robot kinematics to requirements of a task are described. A robotic arm may use less energy when dealing with a sequence of manipulation tasks compared to other non-modular approaches. The systems and techniques described herein provide for an increased lifetime of motors, reduced operational costs, or a lower carbon footprint for robotics-based warehouse fulfillment centers, or elsewhere. Two example techniques include an internal locking of a joint and a dynamical modular robotic arm.

Robot energy optimization is typically addressed through optimal planning algorithms that reduce the time it takes to perform a task or to move the robotic arm from point A to point B. However, operational costs derived from robot energy consumption are greatly overlooked in current warehouse scenarios. The predicted rapid year-over-year increase of robots in the workforce in the near future may cause greater energy usage concerns. Optimal motion planning algorithms provide energy savings in terms of reduced energy consumption and reduced task execution times. However, these techniques do not dynamically change power consumption of a robotic arm by changing the degrees of freedom of the robotic arm as needed by a task.

The systems and techniques described herein include a combination of motion planning, control algorithm, and optionally a modular robotic arm. The robotic arm may enable or disable one or more of its motors during its normal operation. This allows the robotic arm to save energy otherwise required to compensate torques to maintain a position, orientation, or movement. A motion planning or control algorithm may be used to extend current planning systems with an extra variable to enable or disable a motor of a robotic arm. In some examples, robotic actions may be planned by starting from low DoF for initial easier motions and progressing to increased DoF as task complexity increases.

In an example, a robotic arm may disengage unused degrees of freedom by internally locking a joint (e.g., preventing a motor from rotating). In this example, engagement of the DoF of a robotic arm may be rapidly changed to adapt to changing conditions quickly by locking or unlocking a motor. In another example, a robotic arm may change its physical configuration by attaching or detaching parts of the robotic arm. In this example, physically detaching segments of the robotic arm may result in a slower process, but provides the benefit of reducing total arm mass, resulting in significantly greater energy savings.

FIG. 1 illustrates a block diagram 100 showing robotic task degree of freedom planning according to an example. The diagram 100 may be initiated at a starting block 102. One or more objects may be detected at block 104, which may retrieve or store a task object from a database 106. Processing circuitry may be used to plan a manipulation sequence at block 108, for example using an object grasp sequence retrieved or stored in a database 110. In planning, a determination at decision block 112 may be made as to whether a next object in the object grasp sequence is reachable with current DoF of a robotic arm. If not, an additional DoF may be attached (e.g., unlocked or physically added to the robotic arm) at block 114. After attaching an additional DoF at block 114, the decision block 112 may redetermine whether the next object is reachable with the current DoF. Whenever the next object is reachable with current DoF (whether more DoF has been attached or not), a determination may be made at decision block 116 as to whether the next object may be grasped with one fewer DoF than a current DoF. In examples where a DoF was attached at block 114, decision block 116 may be skipped. When one fewer DoF may be used, a DoF may be detached at block 118 (e.g., locking a joint or removing a link of the robotic arm). When one fewer DoF is not usable, the block diagram 100 continues at block 120 to plan and execute grasping of the next object with the current DoF. At decision block 122, a determination may be made as to whether there are any objects left to grasp in the sequence. If not, the process may end at 124. When there are more objects to grasp, the block diagram 100 returns to decision block 112.

Block 104 may be performed using visual perception of the robotic arm to obtain a representation of a task environment, and one or more objects to be manipulated. The representation may be used in a motion planning algorithm to determine a sequence of objects to manipulate (if more than one object is present) and how the robotic arm is to interact with the one or more objects. Before execution of a manipulation action, a motion planner may iteratively determine what degrees of freedom are needed to solve the task.

In some examples, the block diagram 100 may be used with a robotic arm that includes human-robot scenarios (e.g., a cobot or collaborative robot). For example, motors may be disabled or enabled in runtime, and a plan may change when a reaction maneuver is required (e.g., to avoid a human or to react compliantly to external forces applied by a collaborating human).

In some examples, a force or torque required for a smooth transition may be determined to unlock a joint. This determination can help avoid unlocking a joint in such a manner as to produce instability or a transitory pulse introducing jerk. By sensing torque in a locked joint, energy saved may be estimated through the Euler-Lagrange equation:

$$F = \frac{d}{dt}\frac{\partial L}{\partial \dot{q}} - \frac{\partial L}{\partial q}; L = T - V \quad \text{Eq. 1}$$

Where q represents the joint angle and L is the LaGrange L=T−V, where T is kinetic energy, and V is potential energy. Using Equation 1, unused torque is not wasted to keep a joint fixed and instead may be injected to the motor on unlocking to achieve a smooth transition from locked to unlocked state.

Figure 2:
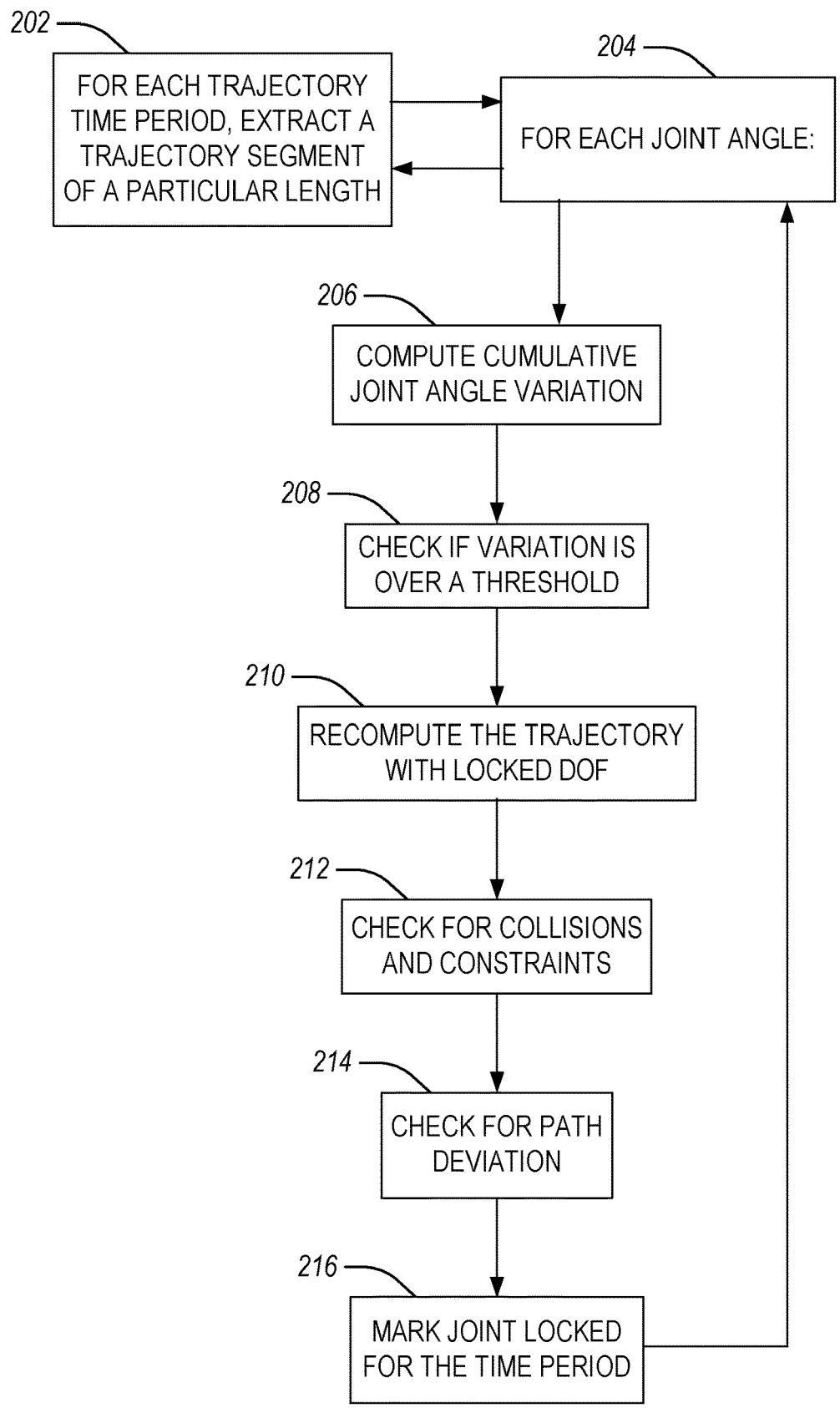
FIG. 2 illustrates a flowchart showing an adaptive degree of freedom trajectory execution technique according to an example.

FIG. 2 illustrates a flowchart 200 showing an adaptive degree of freedom trajectory execution technique according to an example. For example, a cumulative variation of each joint may be computed. The flowchart 200 includes an operation 202 to, for each trajectory time period, extract a trajectory segment of a particular length. The flowchart 200 includes an operation 204 to perform further operations for each joint angle, which are described in operations 206-216.

The flowchart includes an operation 206 to compute a cumulative joint angle variation for a joint angle. The cumulative joint angle may be a total amount of change between a first path having a first DoF and a second path having a second DoF (e.g., with the joint under consideration unlocked and then locked). In operation 208, the variation of the joint angle over the path is checked against a threshold (e.g., zero, more than zero set by a user, a default amount, one degree, etc.). In operation 210, the trajectory is recomputed with the joint locked. Using this trajectory, collisions and constraints are checked in operation 212 and path deviation is checked in operation 214 (e.g., zero path deviation, or a second threshold maximum path deviation). When the variation does not exceed the threshold, and the checks on collisions and constraints and path deviation pass, the flowchart shows operation 216 to mark the joint locked for the time period (e.g., found or specified in operation 202).

Most of the time, when a trajectory is being executed, the critical determination is whether the robotic arm moves its end effector from point A to point B without colliding with the environment. Paths generated by motion planners typically guarantee such constraints. However, often it is possible to deviate from the planned path without violating the conditions to reach the end goal and avoid collisions (e.g., along a slightly longer path). The DoF trajectory execution flowchart 200, modifies the path generated by a motion planner in such a way that the goals are still reached, constraints are satisfied, but the path is slightly modified to maximize the locking underutilized degrees of freedom and save energy.

Figure 3:
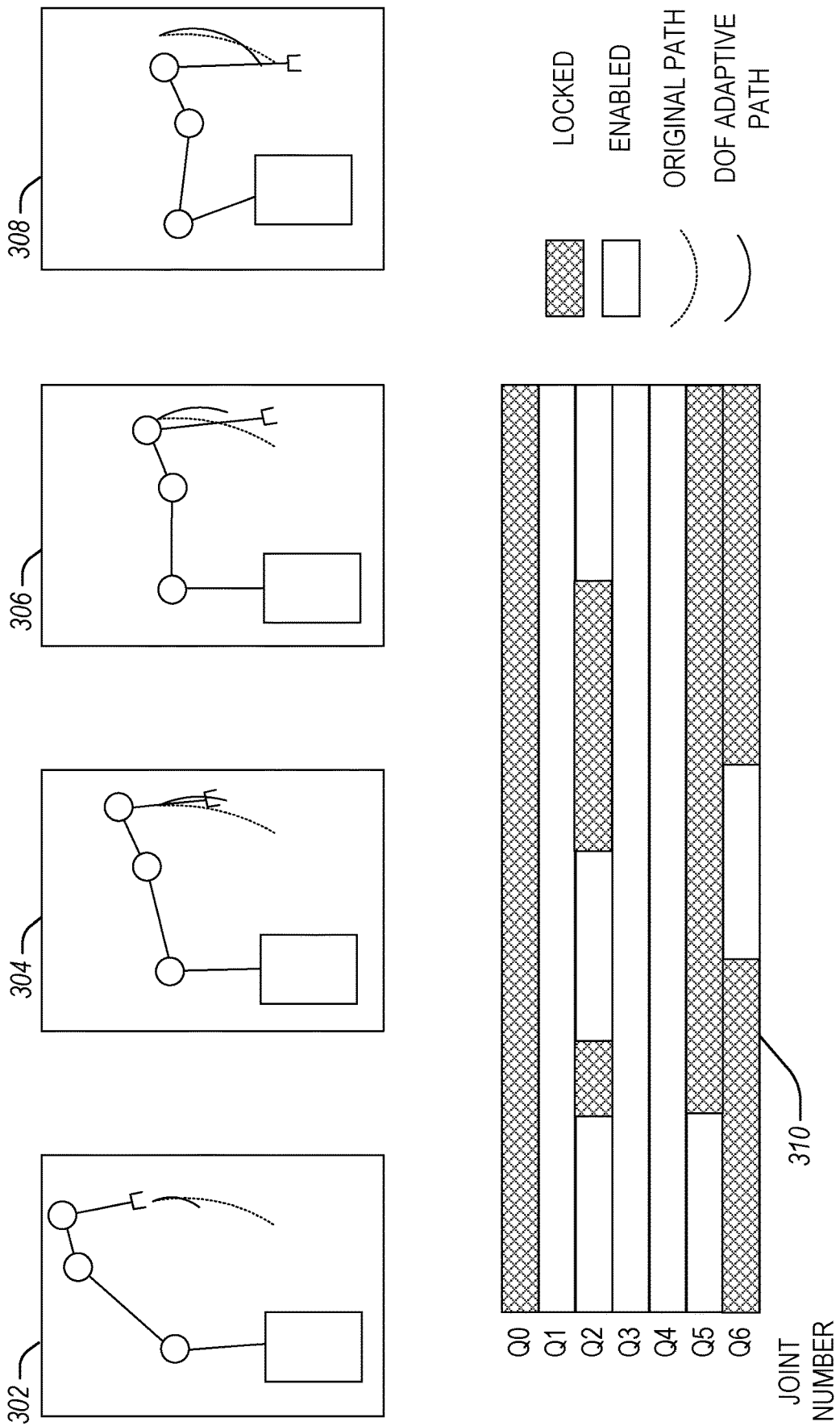
FIG. 3 illustrates a trajectory execution using a robotic arm over time according to an example.

FIG. 3 illustrates a trajectory execution using a robotic arm over time according to an example. Blocks 302-308 illustrate the robotic arm simulated along two paths, an original path (shown in a dotted line) and a DoF adaptive path (shown in a solid line). The paths may differ, but an end effector of the robotic arm still moves from a same initial point in to a same ending point in either path. Chart 310 shown in FIG. 3 illustrates various joints (not all are shown on the robotic arm in blocks 302-308) over time along the adaptive path. The joints are labeled Q0-Q6, indicating there are seven joints in the robotic arm. Over time, some joints may be locked throughout the adaptive path. For example, Q0 may be locked for the entire adaptive path (e.g., where Q0 is a base joint). Q1, Q3, and Q4, on the other hand, are shown as enabled (i.e., not locked) for the entire adaptive path. Joints Q2 and Q5 start enabled, but then are locked at a certain point, with joint Q2 being then unlocked, locked again, and finally unlocked. Similarly, joint Q6 starts locked, then is unlocked, then is locked again.

A measurement of an amount of time that the joints are locked may be used to provide an indication of energy savings achieved by using the adaptive path instead of the original path. While the adaptive path deviates from the original path slightly, the amount of deviation tolerated may be tuned or specified with a configuration parameter, for example as described above with respect to FIG. 2.

Figure 4:
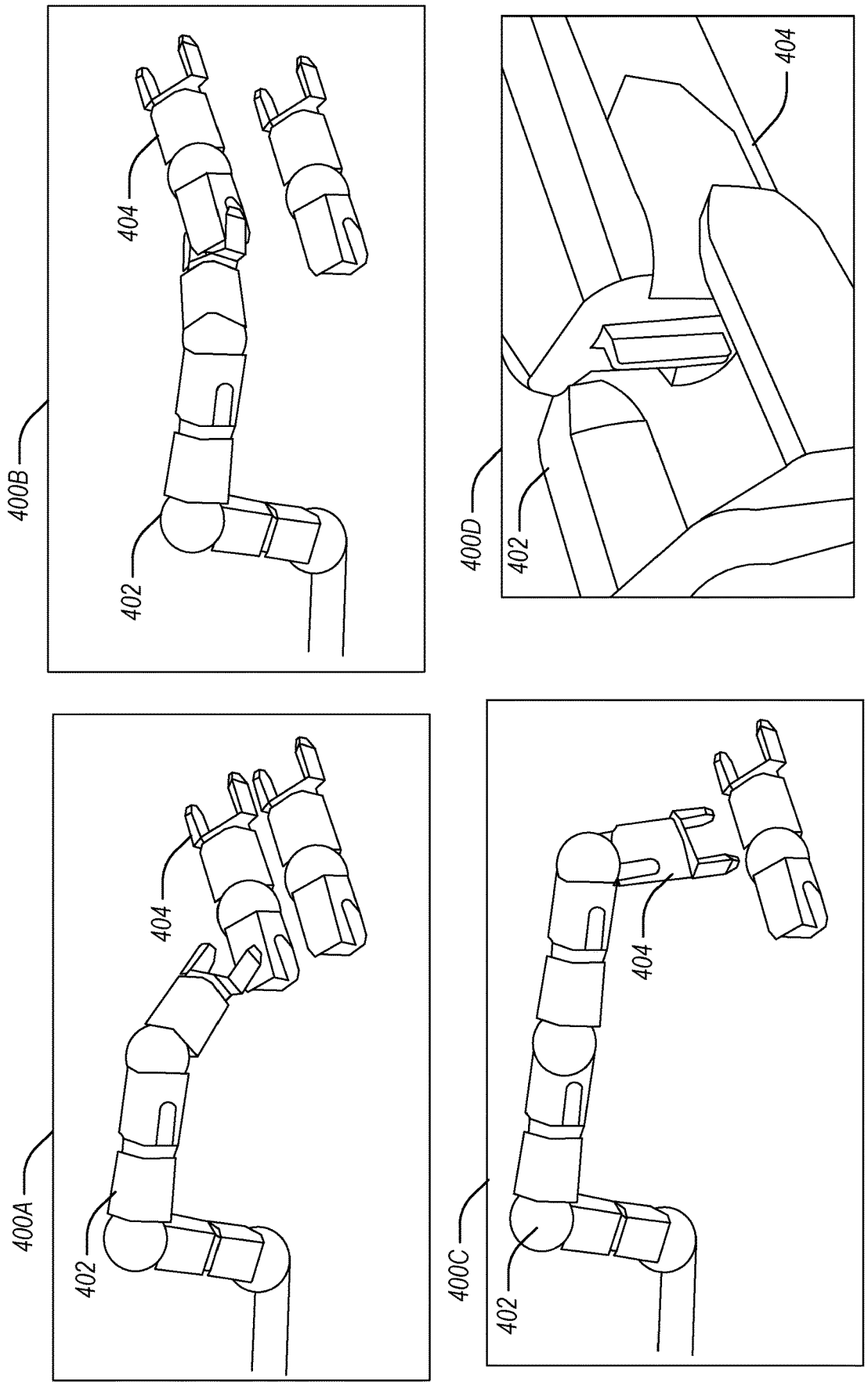
FIG. 4 illustrates a modular robotic arm in several configurations according to an example.

FIG. 4 illustrates a modular robotic arm 402 in several configurations according to an example. The modular robotic arm 402 may differ from a typical robotic arm in that the modular robotic arm 402 may change a number of joints or links by adding or removing joints and links. For example, FIG. 4 illustrates the modular robotic arm 402 over time in three different snapshots 400A-400C. Snapshot 400A shows the modular robotic arm 402 without link 404 attached. Snapshot 400B shows the modular robotic arm 402 attaching to link 404. Snapshot 400C shows the modular robotic arm 402 using link 404, which is now attached. View 400D illustrates how the modular robotic arm 402 attaches link 404 to its most distal current end effector. Each link may have its own end effector, configured to fit into an opposite end of a link. The modular robotic arm latch mechanism may include power and data connections to increase the robot reach and kinematic DoFs for grasping new segments. A link may be added or removed based on a determined minimum DoF required for a particular task.

Simple objects that allow multiple options for manipulation may be grasped with less robotic arm complexity (e.g., fewer links and joints). When available grasp poses are limited, a more complex robotic arm may be required to reach a specific pose in 6D without colliding with the environment. Adding or removing segments of the robotic arm may be time consuming and may use careful planning to minimize the number of changes. In some examples, changes may only be made in increments of 1. Thus, planning the sequence of manipulation actions may be optimized by grasping objects in a sequence that uses increasing or decreasing order of degrees of freedom. For example, the most complex tasks may be performed initially, with the modular robotic arm 402 at a maximum needed number of joints and links. Then, when the complex tasks are completed, one or more links may be removed to perform less-complex tasks. As links are removed, a final task may use a minimum number of links. In other examples, the reverse order may be used where an initial task requires the fewest DoF, and links are added over the sequence. In some examples, to optimize for time, tasks may be grouped. For example, for a sequence of tasks having an ordered DoF complexity of one link, one link, three links, six links, seven links, seven links, and seven links, the task requiring six links may be grouped into the tasks requiring seven links, and performed with seven links to save the time of adding links to six and then performing only one task before adding another link to seven.

FIG. 5 illustrates pseudocode 500 for a variable degree of freedom planning algorithm according to an example. In an example, a planner may be modified to consider a change in the number of DoFs available on the fly or via pre-planning. In an example, a sampling-based technique may be used with a heuristic cost-function approach based on a linear combination of the energy wasted to achieve a goal and a number of degrees of freedom. In some examples, dynamic constraints of a robotic arm may be considered, for example with collision avoidance (e.g., self-collision or with the environment). To facilitate human-robot collaboration such as in warehouses, predicted motion from a human may be considered (e.g., as a time-dependent trajectory). This approach may allow a planner and the robotic arm to activate DoFs to increase robot dexterity, providing more freedom to avoid such human movements and reach a goal (e.g., an object).

An example algorithm is shown in FIG. 5. The algorithm takes as input a starting configuration $q_s$, which can be a current configuration of a robotic arm or a future configuration, such as when the planner is used for re-planning or pre-planning. The algorithm includes a desired final goal $q_g$, a maximum degrees of freedom $DoFs_{MAX}$, and example human-predicted trajectories to avoid $q_H(t) \in Q_H$. The robotic arm direct kinematics may be computed using Denavit-Hartenberg (DH) parameters. The energy consumption to move between two robot configurations may be obtained via the LaGrange equation. The algorithm may be used to construct a directed graph, Tree, with the starting configuration as the root node and connected with a child node at the goal. First, a node $N_r$ is selected from the node list (e.g., the starting configuration for the first iteration). Second, a random configuration state $q_r$ constrained by the joint limits is obtained. To optimize node memory consumption, locked joints are represented as segments with start and end points at the same location. The sampling process may be kept the same regardless of the number of active DoFs. A decision may be made according to a predefined probability $p_l$, allowing the locking and unlocking of different joints for each segment independently of the robotic arm's degrees of freedom. A segment formed by the sampled node and the random configuration may be checked to determine whether it is collision-free and self-collision-free. The random configuration is discarded if one of these conditions is not fulfilled. Otherwise, dynamical movement $q_r(t)$ may be computed using the dynamic description of the robot. In some examples, there are optimized techniques to compute robot forward dynamics. Where available, the resultant trajectory may be compared with the human predicted trajectory. When a collision is detected, the random configuration is discarded. If no collision is detected, the node is added to the graph, and the cost is computed using:

$$\text{cost} = k_d q_\tau(t) - k_j p_t, \qquad \text{Eq. 2}$$

where, $q_\tau(t)$ is the computed torque in this motion segment, and $k_d$ and $k_j$ are weights that allow for tuning importance of energy savings or number of degrees of freedom used. The closest node neighbors to the random configuration may be obtained according to a radius given by:

$$\gamma *= 2\left(1 + \frac{1}{DoFs_{MAX}}\right)^{\frac{1}{DoFs_{MAX}}} \left(\frac{\mu}{\#N}\right)^{\frac{1}{DoFs_{MAX}}}, \qquad \text{Eq. 3}$$

with $\mu$ being the Lebesgue measure, and #N the cardinality of the directed graph Tree. The collisions may be reviewed towards all the nodes. The cost may be computed. When a lower cost is detected, the node may be reconfigured. The algorithm may end when a random configuration is close to the desired goal configuration (e.g., reaches the goal or is within a threshold, such as a threshold energy savings, speed, number of degrees of freedom, etc.). The multi-degree activation is directly embedded into the planner solution, which produces a feasible trajectory, allowing joints to be locked or unlocked on the fly or according to a pre-planned path.

Figure 6:
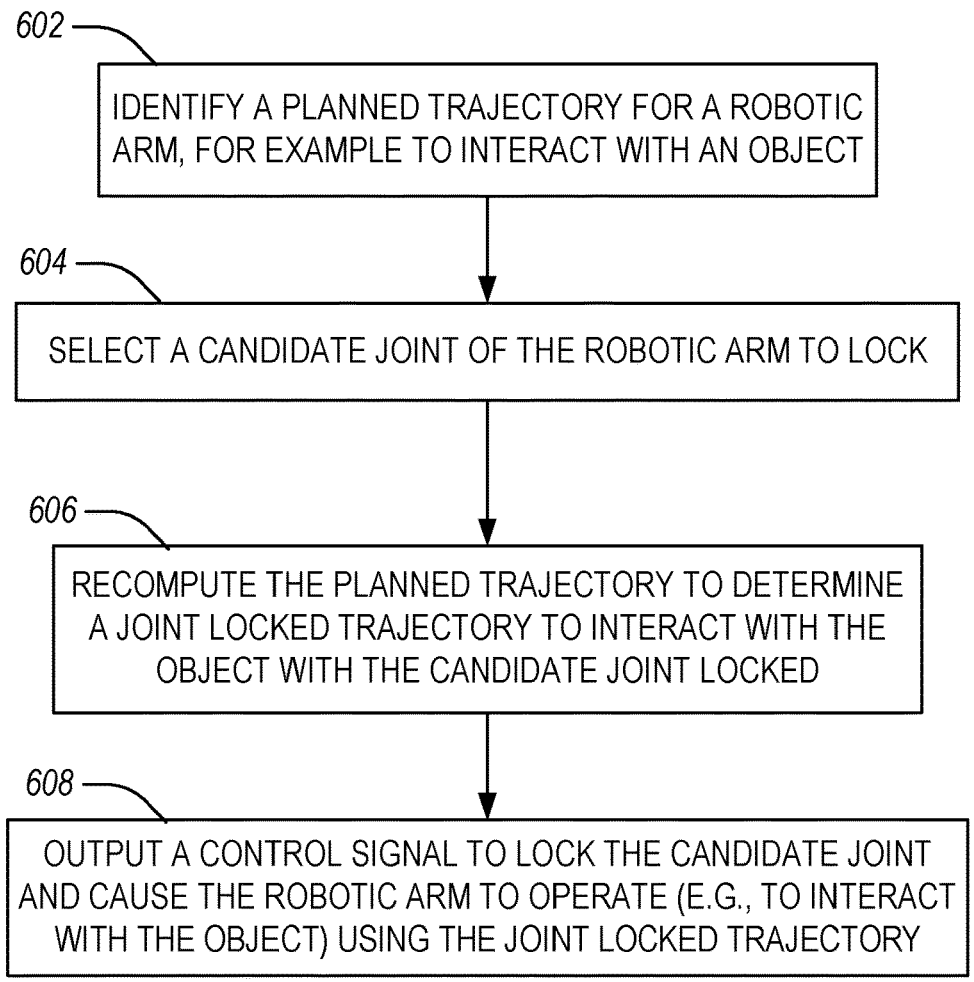
FIG. 6 illustrates a flowchart showing a technique for using an energy efficient robotic arm according to an example.

FIG. 6 illustrates a flowchart showing a technique 600 for using an energy efficient robotic arm according to an example. The technique 600 may be performed by a computing device (e.g., including processing circuitry), by a robotic device (e.g., including processing circuitry), etc.

The technique 600 includes an operation 602 to identify a planned trajectory for a robotic arm, for example to interact with an object. The planned trajectory may be identified by retrieving it from memory, receiving a user input, receiving an indication to initiate the technique 600, or the like.

The technique 600 includes an operation 604 to select a candidate joint of the robotic arm to lock. In some examples, the candidate joint may be selected according to a selected order (e.g., from a base to an end effector or the reverse). In other examples, the candidate joint may be selected based on a criteria, such as highest energy cost, smallest path movement in the planned trajectory, or the like.

The technique 600 includes an operation 606 to recompute the planned trajectory to determine a joint-locked trajectory to interact with the object with the candidate joint locked. The joint-locked trajectory may include a second locked joint. Operation 606 may include checking for collisions or constraints on the robotic arm for the joint-locked trajectory. In some examples, operation 606 includes determining whether the path deviates throughout the joint-locked trajectory by more than a maximum threshold distance, and in response to determining that the path does not deviate by more than the maximum threshold distance, validating the joint-locked trajectory. In an example, during the planned trajectory, the robotic arm may interact with a plurality of objects, including the object, for example. In this example, operation 606 may include determining the joint-locked trajectory to interact with the plurality of objects with the candidate joint locked.

In an example, operation 606 includes computing a cumulative joint angle variation during the planned trajectory. In this example, recomputing the planned trajectory may include determining whether the cumulative joint angle variation exceeds a threshold angle variation during the planned trajectory. In response to determining that the threshold angle variation is not exceeded, operation 606 may include validating that the candidate joint is lockable during the joint-locked trajectory. In this example, recomputing the planned trajectory may include determining whether the cumulative joint angle variation is zero, and in response to determining that the cumulative joint angle variation is zero, validating that the candidate joint is lockable during the joint-locked trajectory.

The technique 600 includes an operation 608 to output a control signal to lock the candidate joint and cause the robotic arm to operate (e.g., to interact with the object) using the joint-locked trajectory. The technique 600 may include selecting a second candidate joint of the robotic arm to lock, determining whether a second cumulative joint angle variation for the second candidate joint exceeds a threshold angle variation during the planned trajectory, and in response to determining that the threshold angle variation is exceeded for the second candidate joint, validating that the second candidate joint is not lockable during the joint-locked trajectory.

Figure 7:
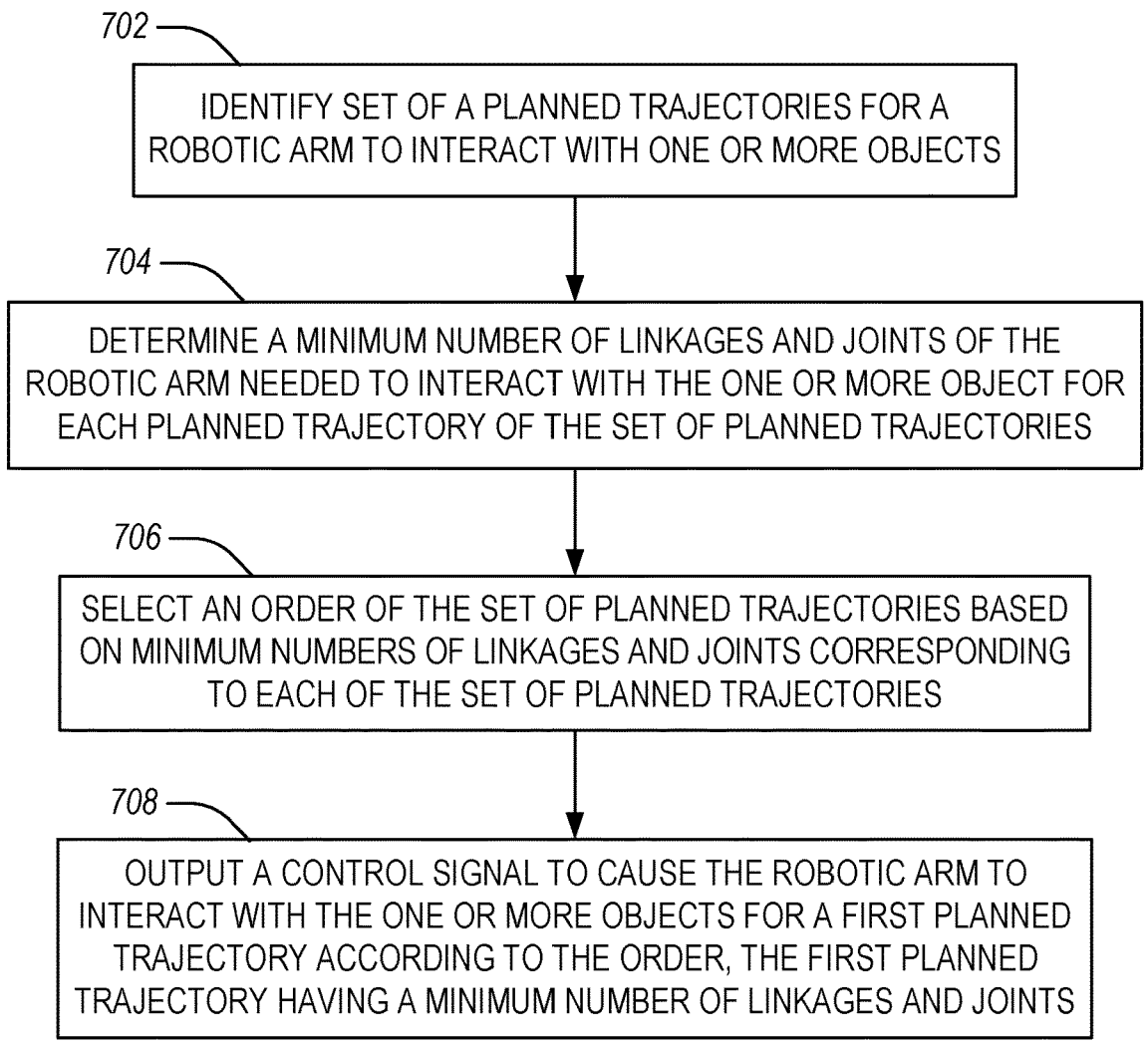
FIG. 7 illustrates a flowchart showing a technique for configuring an energy efficient robotic arm according to an example.

FIG. 7 illustrates a flowchart showing a technique 700 for configuring an energy efficient robotic arm according to an example. The technique 700 may be performed by a computing device (e.g., including processing circuitry), by a robotic device (e.g., including processing circuitry), etc.

The technique 700 includes an operation 702 to identify set of a planned trajectories for a robotic arm to interact with one or more objects.

The technique 700 includes an operation 704 to determine a minimum number of linkages and joints of the robotic arm needed to interact with the one or more object for each planned trajectory of the set of planned trajectories. Operation 704 may include checking for collisions and constraints on the robotic arm for each planned trajectory of the set of planned trajectories.

The technique 700 includes an operation 706 to select an order of the set of planned trajectories based on minimum numbers of linkages and joints corresponding to each of the set of planned trajectories.

The technique 700 includes an operation 708 to output a control signal to cause the robotic arm to interact with the one or more objects for a first planned trajectory according to the order, the first planned trajectory having a minimum number of linkages and joints.

The technique 700 may include operations to identify a second planned trajectory having one or more linkages and joints than the first planned trajectory, and in response output a control signal to cause the robotic arm to add a linkage and a joint.

Determining the first planned trajectory or the second planned trajectory may include checking for collisions or constraints on the robotic arm. In some examples, determining the first planned trajectory or the second planned trajectory includes determining whether a path deviates throughout the joint-locked trajectory by more than a maximum threshold distance, and in response to determining that the path does not deviate by more than the maximum threshold distance, validating the joint-locked trajectory. In an example, during the first or second planned trajectory, the robotic arm may interact with a plurality of objects, for example.

In further examples, any of the compute nodes or devices discussed with reference to the present edge computing systems and environment may be fulfilled based on the components depicted in FIGS. 8A and 8B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8A:
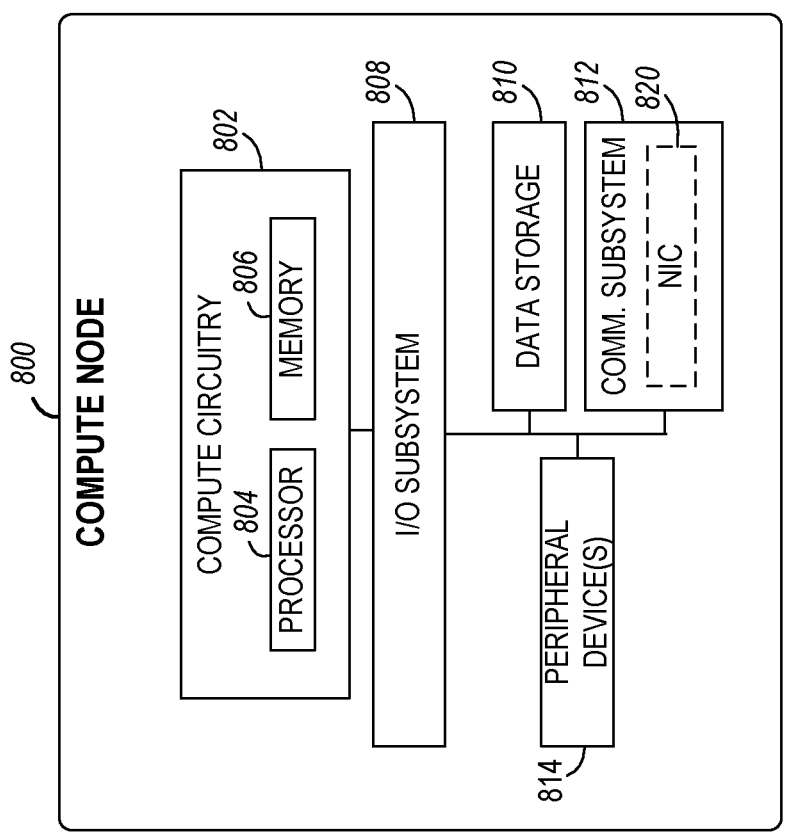
FIG. 8A provides an overview of example components for compute deployed at a compute node.

In the simplified example depicted in FIG. 8A, an edge compute node 800 includes a compute engine (also referred to herein as "compute circuitry") 802, an input/output (I/O) subsystem 808, data storage 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or other processor or processing/controlling circuit.

In some examples, the processor 804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 or the main memory 806) and other components of the compute circuitry 802. For example, the I/O subsystem 808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices 810 may be embodied as any type of devices configured for short-term or long-term storage of data such as, for example, memory devices and circuits, memory cards, hard disk drives, solid-state drives, or other data storage devices. Individual data storage devices 810 may include a system partition that stores data and firmware code for the data storage device 810. Individual data storage devices 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., a gateway of an implementing computing system). The communication circuitry 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., a gateway node). In some examples, the NIC 820 may be embodied as part of a system-on-a-chip (SoC) that includes one or more processors, or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or alternatively, in such examples, the local memory of the NIC 820 may be integrated into one or more components of the client compute node at the board level, socket level, chip level, or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective compute node (whether a client, gateway, or aggregation node) in a computing system or like forms of appliances, computers, subsystems, circuitry, or other components.

Figure 8B:
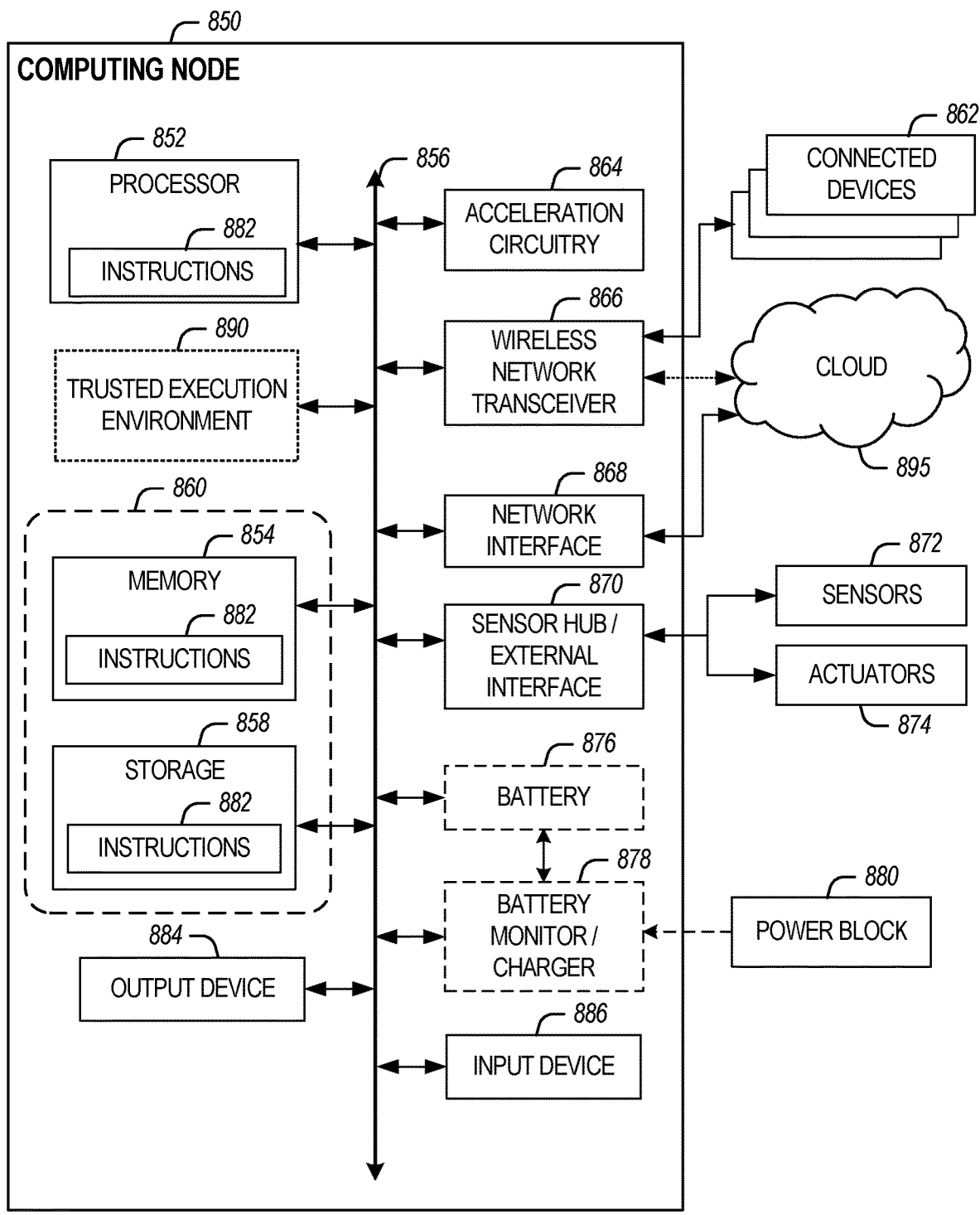
FIG. 8B provides a further overview of example components within a computing device.

In a more detailed example, FIG. 8B illustrates a block diagram of an example of components that may be present in a computing node 850 for implementing the techniques (e.g., operations, processes, methods, and methodologies) described herein. This computing node 850 provides a closer view of the respective components of node 800 when implemented as or as part of a computing device (e.g., as a mobile device, a base station, server, gateway, etc.). The computing node 850 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 850, or as components otherwise incorporated within a chassis of a larger system.

The computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As examples, the memory 854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the computing node 850 may communicate with close devices, e.g., within about 10 meters, using a local transceiver based on Bluetooth Low Energy (BLE), or another low power radio, to save power. More distant connected devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the cloud 895 via local or wide area network protocols. The wireless network transceiver 866 may be a low-power wide-area (LPWA) transceiver that follows the IEEE 802.15.4, or IEEE 802.15.4g standards, among others. The computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the cloud 895 or to other devices, such as the connected devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the computing node 850 to actuators 874, such as power switches, valve actuators, an audible sound generator, a visual warning device, and the like.

In some optional examples, various input/output (I/O) devices may be present within or connected to, the computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 850. A display or console hardware, in the context of the present system, may be used to provide output and receive input of a computing system; to manage components or services of a computing system; identify a state of a computing component or service; or to conduct any other number of management or administration functions or service use cases.

A battery 876 may power the computing node 850, although, in examples in which the computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is at least one machine-readable medium including instructions, which when executed by processing circuitry, cause the processing circuitry to perform operations to: identify a planned trajectory for a robotic arm to interact with an object; select a candidate joint of the robotic arm to lock; recompute the planned trajectory to determine a joint-locked trajectory to interact with the object while the candidate joint is locked; and output a control signal to lock the candidate joint and cause the robotic arm to interact with the object using the joint-locked trajectory.

In Example 2, the subject matter of Example 1 includes, wherein the joint-locked trajectory includes a second locked joint.

In Example 3, the subject matter of Examples 1-2 includes, wherein to recompute the planned trajectory, the operations include to compute a cumulative joint angle variation during the planned trajectory.

In Example 4, the subject matter of Example 3 includes, wherein to recompute the planned trajectory, the operations include to determine whether the cumulative joint angle variation exceeds a threshold angle variation during the planned trajectory, and in response to determining that the threshold angle variation is not exceeded, to validate that the candidate joint is lockable during the joint-locked trajectory.

In Example 5, the subject matter of Examples 3-4 includes, wherein to recompute the planned trajectory, the operations include to determine whether the cumulative joint angle variation is zero, and in response to determining that the cumulative joint angle variation is zero, to validate that the candidate joint is lockable during the joint-locked trajectory.

In Example 6, the subject matter of Examples 1-5 includes, wherein the instructions further include operations to select a second candidate joint of the robotic arm to lock, determine whether a second cumulative joint angle variation for the second candidate joint exceeds a threshold angle variation during the planned trajectory, and in response to determining that the threshold angle variation is exceeded for the second candidate joint, to validate that the second candidate joint is not lockable during the joint-locked trajectory.

In Example 7, the subject matter of Examples 1-6 includes, wherein to recompute the planned trajectory, the operations include to check for collisions and constraints on the robotic arm for the joint-locked trajectory.

In Example 8, the subject matter of Examples 1-7 includes, wherein to recompute the planned trajectory, the operations include to determine whether a path of the robotic arm deviates throughout the joint-locked trajectory by more than a maximum threshold distance, and in response to determining that the path does not deviate by more than the maximum threshold distance, to validate the joint-locked trajectory.

In Example 9, the subject matter of Examples 1-8 includes, wherein during the planned trajectory, the robotic arm is to interact with a plurality of objects, including the object, and wherein to recompute the planned trajectory to determine the joint locked trajectory includes to recompute the planned trajectory to determine the joint-locked trajectory to interact with the plurality of objects with the candidate joint locked.

Example 10 is a system comprising: a robotic arm comprising links connected by at least two joints, each joint of the at least two joints connecting a pair of links and including a locking mechanism; processing circuitry; and memory, including instructions, which when executed by the processing circuitry, cause the processing circuitry to perform operations to: identify a planned trajectory for the robotic arm to interact with an object; select a candidate joint of the at least two joints of the robotic arm to lock; recompute the planned trajectory to determine a joint-locked trajectory to interact with the object while the candidate joint is locked; and output a control signal to the robotic arm to lock the candidate joint and cause the robotic arm to interact with the object using the joint locked trajectory.

In Example 11, the subject matter of Example 10 includes, wherein the joint-locked trajectory includes a second locked joint.

In Example 12, the subject matter of Examples 10-11 includes, wherein to recompute the planned trajectory, the operations include to compute a cumulative joint angle variation during the planned trajectory.

In Example 13, the subject matter of Example 12 includes, wherein to recompute the planned trajectory, the operations include to determine whether the cumulative joint angle variation exceeds a threshold angle variation during the planned trajectory, and in response to determining that the threshold angle variation is not exceeded, to validate that the candidate joint is lockable during the joint-locked trajectory.

In Example 14, the subject matter of Examples 12-13 includes, wherein to recompute the planned trajectory, the operations include to determine whether the cumulative joint angle variation is zero, and in response to determining that the cumulative joint angle variation is zero, to validate that the candidate joint is lockable during the joint-locked trajectory.

In Example 15, the subject matter of Examples 10-14 includes, wherein the instructions further include operations to select a second candidate joint of the robotic arm to lock, determine whether a second cumulative joint angle variation for the second candidate joint exceeds a threshold angle variation during the planned trajectory, and in response to determining that the threshold angle variation is exceeded for the second candidate joint, to validate that the second candidate joint is not lockable during the joint-locked trajectory.

In Example 16, the subject matter of Examples 10-15 includes, wherein to recompute the planned trajectory, the operations include to check for collisions and constraints on the robotic arm for the joint-locked trajectory.

In Example 17, the subject matter of Examples 10-16 includes, wherein to recompute the planned trajectory, the operations include to determine whether a path of the robotic arm deviates throughout the joint-locked trajectory by more than a maximum threshold distance, and in response to determining that the path does not deviate by more than the maximum threshold distance, to validate the joint-locked trajectory.

Example 18 is at least one machine-readable medium including instructions, which when executed by processing circuitry, cause the processing circuitry to perform operations to: identify a set of planned trajectories for a robotic arm to interact with one or more objects; determine a respective minimum number of linkages and joints of the robotic arm needed to interact with the one or more objects for each planned trajectory of the set of planned trajectories; select an order of the set of planned trajectories based on minimum numbers of linkages and joints corresponding to each of the set of planned trajectories; and output a control signal to cause the robotic arm to interact with the one or more objects for a first planned trajectory according to the order, the first planned trajectory having a minimum number of linkages and joints.

In Example 19, the subject matter of Example 18 includes, wherein the operations further comprise operations to identify a second planned trajectory having one or more linkages and joints than the first planned trajectory, and in response output a control signal to cause the robotic arm to add a linkage and a joint.

In Example 20, the subject matter of Examples 18-19 includes, wherein to determine the respective minimum number of linkages and joints, the operations include to check for collisions and constraints on the robotic arm for each planned trajectory of the set of planned trajectories.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks), memory cards or sticks, random access memories (RAMs), read only memories (ROMs), and the like.

What is claimed is:

1. At least one machine-readable medium including instructions, which when executed by processing circuitry, cause the processing circuitry to perform operations to:
   identify a planned trajectory for a robotic arm to interact with an object;
   select a candidate joint of the robotic arm to lock;
   recompute the planned trajectory to determine a joint-locked trajectory to interact with the object while the candidate joint is locked; and
   output a control signal to lock the candidate joint and cause the robotic arm to interact with the object using the joint-locked trajectory.

2. The at least one machine-readable medium of claim 1, wherein the joint-locked trajectory includes a second locked joint.

3. The at least one machine-readable medium of claim 1, wherein to recompute the planned trajectory, the operations include to compute a cumulative joint angle variation during the planned trajectory.

4. The at least one machine-readable medium of claim 3, wherein to recompute the planned trajectory, the operations include to determine whether the cumulative joint angle variation exceeds a threshold angle variation during the planned trajectory, and in response to determining that the threshold angle variation is not exceeded, to validate that the candidate joint is lockable during the joint-locked trajectory.

5. The at least one machine-readable medium of claim 3, wherein to recompute the planned trajectory, the operations include to determine whether the cumulative joint angle variation is zero, and in response to determining that the cumulative joint angle variation is zero, to validate that the candidate joint is lockable during the joint-locked trajectory.

6. The at least one machine-readable medium of claim 1, wherein the instructions further include operations to select a second candidate joint of the robotic arm to lock, determine whether a second cumulative joint angle variation for the second candidate joint exceeds a threshold angle variation during the planned trajectory, and in response to determining that the threshold angle variation is exceeded for the second candidate joint, to validate that the second candidate joint is not lockable during the joint-locked trajectory.

7. The at least one machine-readable medium of claim 1, wherein to recompute the planned trajectory, the operations include to check for collisions and constraints on the robotic arm for the joint-locked trajectory.

8. The at least one machine-readable medium of claim 1, wherein to recompute the planned trajectory, the operations include to determine whether a path of the robotic arm deviates throughout the joint-locked trajectory by more than a maximum threshold distance, and in response to determining that the path does not deviate by more than the maximum threshold distance, to validate the joint-locked trajectory.

9. The at least one machine-readable medium of claim 1, wherein during the planned trajectory, the robotic arm is to interact with a plurality of objects, including the object, and wherein to recompute the planned trajectory to determine the joint locked trajectory includes to recompute the planned trajectory to determine the joint-locked trajectory to interact with the plurality of objects with the candidate joint locked.

10. A system comprising:
a robotic arm comprising links connected by at least two joints, each joint of the at least two joints connecting a pair of links and including a locking mechanism;
processing circuitry; and
memory, including instructions, which when executed by the processing circuitry, cause the processing circuitry to perform operations to:
identify a planned trajectory for the robotic arm to interact with an object;
select a candidate joint of the at least two joints of the robotic arm to lock;
recompute the planned trajectory to determine a joint-locked trajectory to interact with the object while the candidate joint is locked; and
output a control signal to the robotic arm to lock the candidate joint and cause the robotic arm to interact with the object using the joint locked trajectory.

11. The system of claim 10, wherein the joint-locked trajectory includes a second locked joint.

12. The system of claim 10, wherein to recompute the planned trajectory, the operations include to compute a cumulative joint angle variation during the planned trajectory.

13. The system of claim 12, wherein to recompute the planned trajectory, the operations include to determine whether the cumulative joint angle variation exceeds a threshold angle variation during the planned trajectory, and in response to determining that the threshold angle variation is not exceeded, to validate that the candidate joint is lockable during the joint-locked trajectory.

14. The system of claim 12, wherein to recompute the planned trajectory, the operations include to determine whether the cumulative joint angle variation is zero, and in response to determining that the cumulative joint angle variation is zero, to validate that the candidate joint is lockable during the joint-locked trajectory.

15. The system of claim 10, wherein the instructions further include operations to select a second candidate joint of the robotic arm to lock, determine whether a second cumulative joint angle variation for the second candidate joint exceeds a threshold angle variation during the planned trajectory, and in response to determining that the threshold angle variation is exceeded for the second candidate joint, to validate that the second candidate joint is not lockable during the joint-locked trajectory.

16. The system of claim 10, wherein to recompute the planned trajectory, the operations include to check for collisions and constraints on the robotic arm for the joint-locked trajectory.

17. The system of claim 10, wherein to recompute the planned trajectory, the operations include to determine whether a path of the robotic arm deviates throughout the joint-locked trajectory by more than a maximum threshold distance, and in response to determining that the path does not deviate by more than the maximum threshold distance, to validate the joint-locked trajectory.

18. At least one machine-readable medium including instructions, which when executed by processing circuitry, cause the processing circuitry to perform operations to:
identify a set of planned trajectories for a robotic arm to interact with one or more objects;
determine a respective minimum number of linkages and joints of the robotic arm needed to interact with the one or more objects for each planned trajectory of the set of planned trajectories;
select an order of the set of planned trajectories based on minimum numbers of linkages and joints corresponding to each of the set of planned trajectories; and
output a control signal to cause the robotic arm to interact with the one or more objects for a first planned trajectory according to the order, the first planned trajectory having a minimum number of linkages and joints.

19. The at least one machine-readable medium of claim 18, wherein the operations further comprise operations to identify a second planned trajectory having one or more linkages and joints than the first planned trajectory, and in response output a control signal to cause the robotic arm to add a linkage and a joint.

20. The at least one machine-readable medium of claim 18, wherein to determine the respective minimum number of linkages and joints, the operations include to check for collisions and constraints on the robotic arm for each planned trajectory of the set of planned trajectories.

* * * * *